L. E. POOLE.
BUTTON FEEDING MECHANISM.
APPLICATION FILED SEPT. 7, 1915.
1,227,825.
Patented May 29, 1917.
5 SHEETS—SHEET 1.
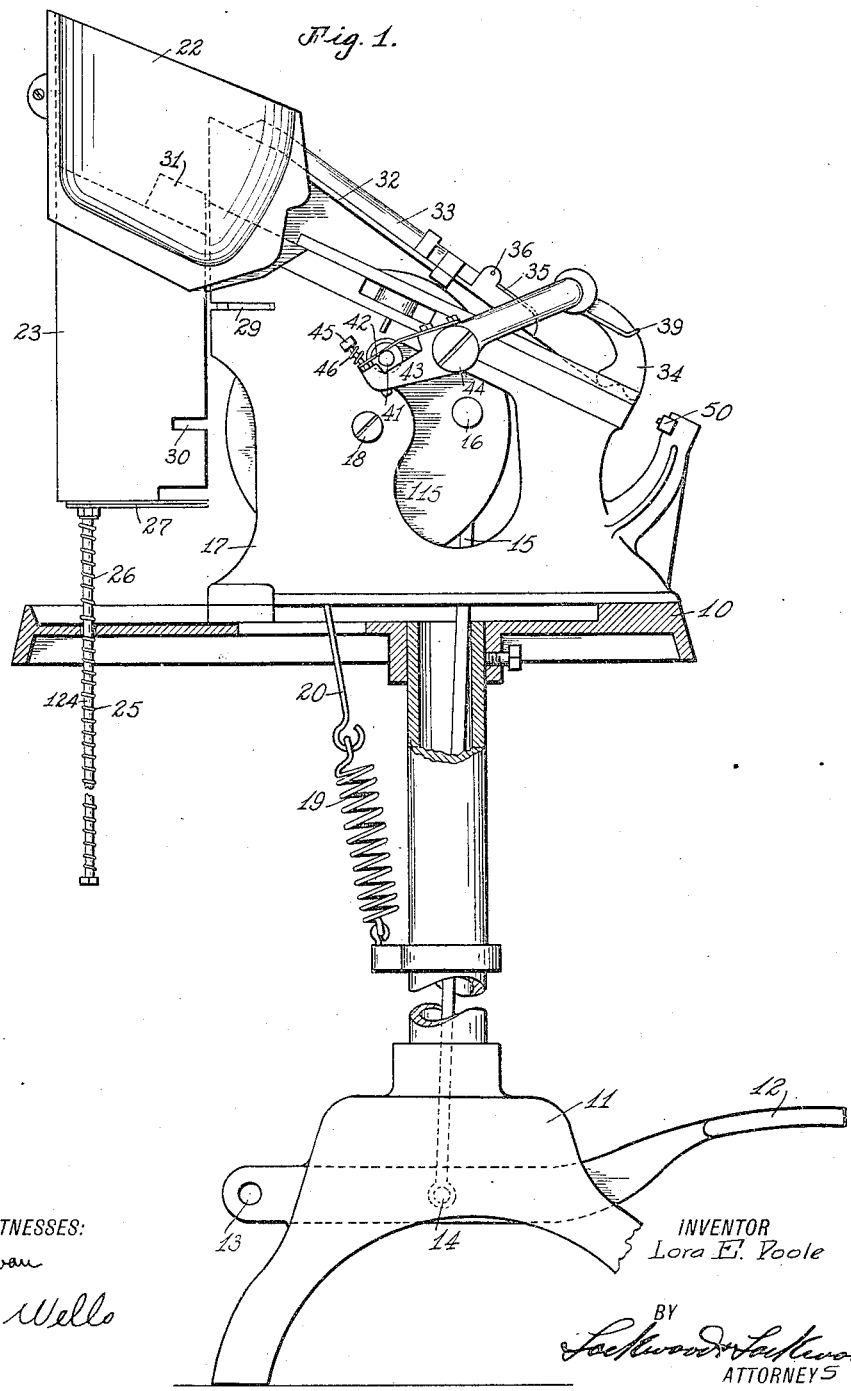
WITNESSES:
INVENTOR
Lora E. Poole
BY
Lockwood & Lockwood
ATTORNEYS

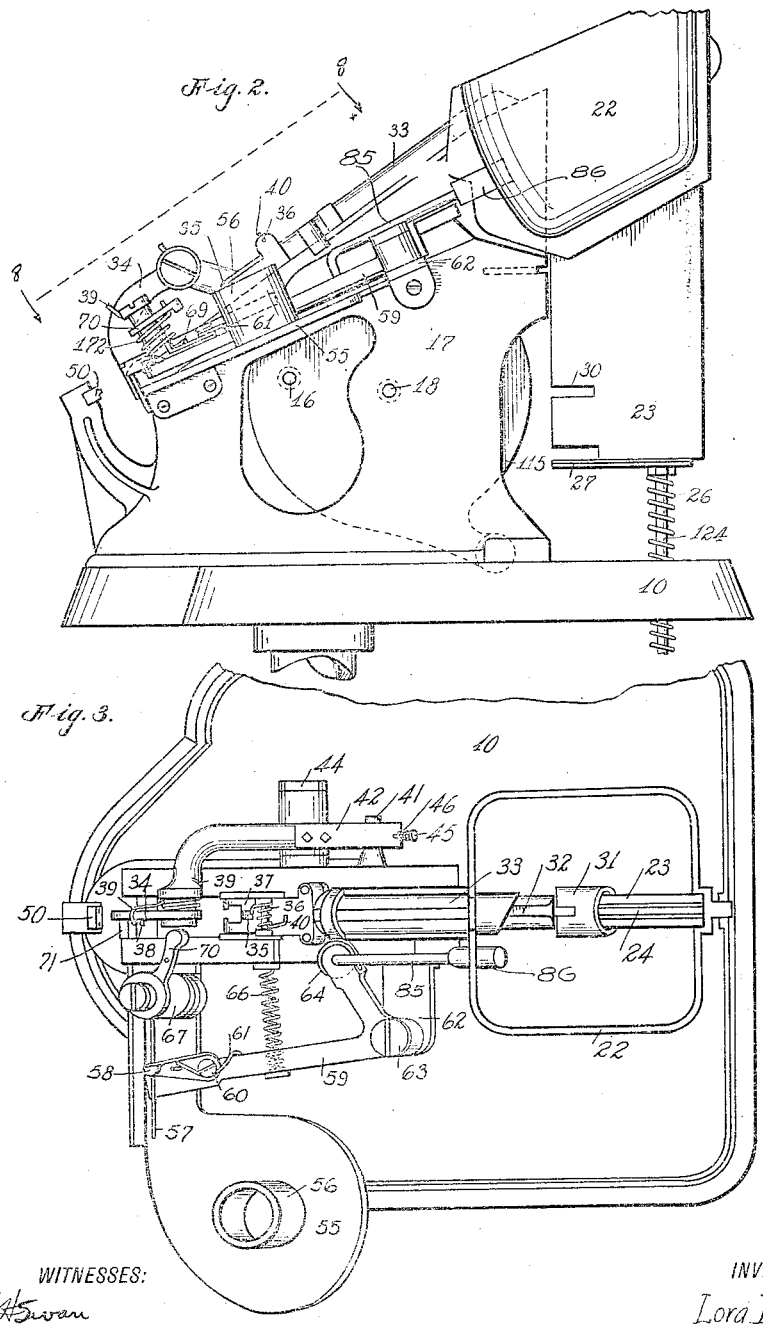

L. E. POOLE.
BUTTON FEEDING MECHANISM.
APPLICATION FILED SEPT. 7, 1915.
1,227,825.
Patented May 29, 1917.
5 SHEETS—SHEET 3.
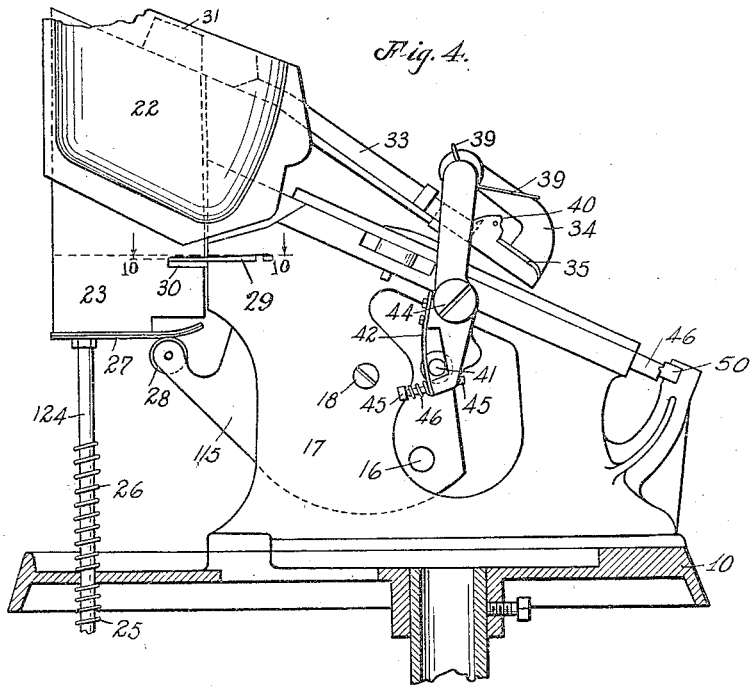
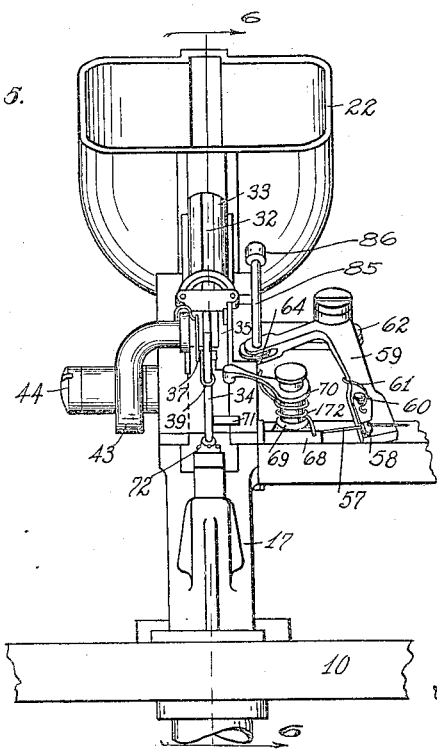
WITNESSES:
J. H. Swan
J. H. Wells
INVENTOR
Lora E. Poole
BY
Lockwood & Lockwood
ATTORNEYS

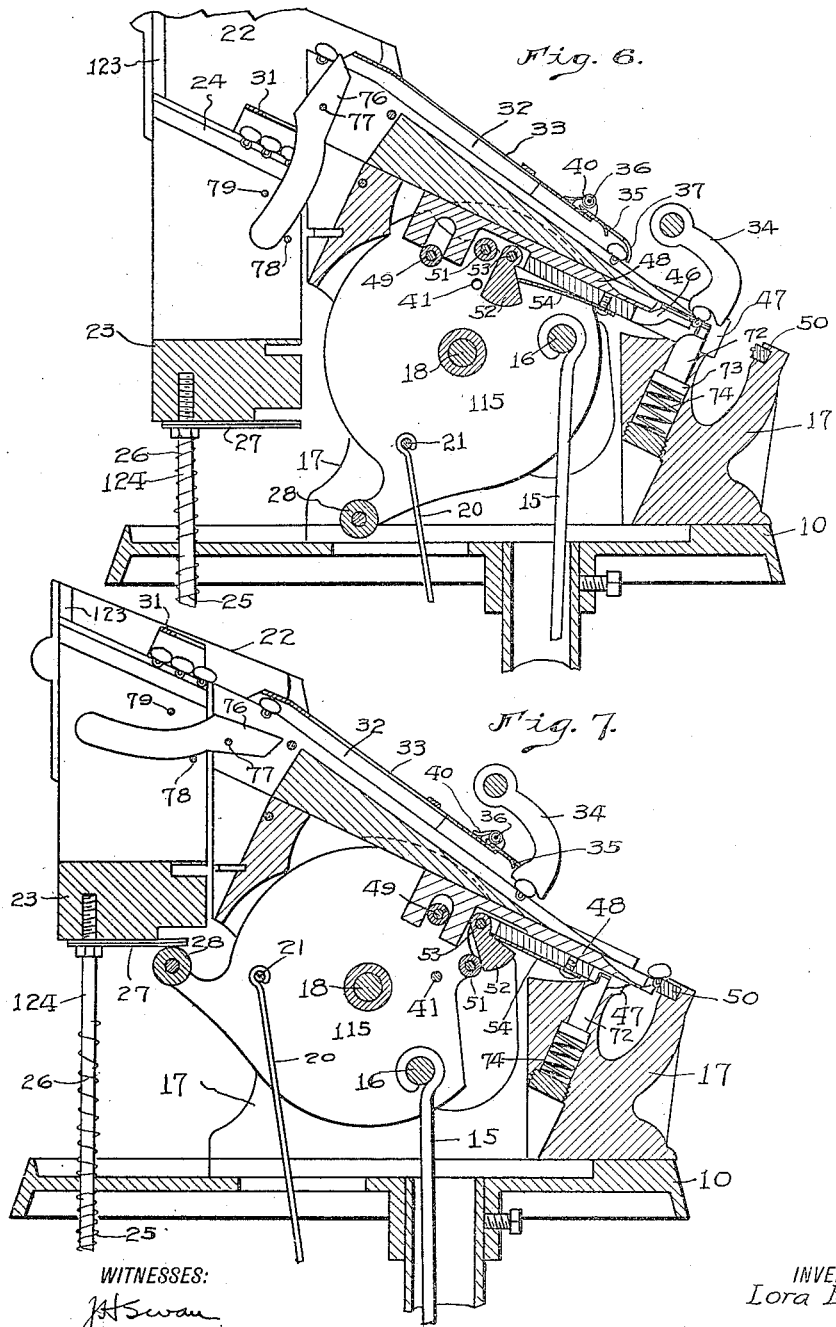

L. E. POOLE.
BUTTON FEEDING MECHANISM.
APPLICATION FILED SEPT. 7, 1915.

1,227,825.

Patented May 29, 1917.
5 SHEETS—SHEET 5.

WITNESSES:
J H Swan
J. H. Wells

INVENTOR
Lora E. Poole

BY
Lockwood & Lockwood
ATTORNEYS

UNITED STATES PATENT OFFICE.

LORA E. POOLE, OF ANDERSON, INDIANA, ASSIGNOR TO ANDERSON BUTTON ATTACHING MACHINE COMPANY, OF ANDERSON, INDIANA, A CORPORATION.

BUTTON-FEEDING MECHANISM.

1,227,825.   Specification of Letters Patent.   Patented May 29, 1917.

Original application filed July 10, 1915, Serial No. 39,077. Divided and this application filed September 7, 1915. Serial No. 49,280.

*To all whom it may concern:*

Be it known that I, LORA E. POOLE, a citizen of the United States, and a resident of Anderson, county of Madison, and State of Indiana, have invented a certain new and useful Button-Feeding Mechanism; and I do hereby declare that the following is a full, clear, and exact description thereof, reference being had to the accompanying drawings, in which like letters refer to like parts.

This invention relates to improvements in machines for feeding and attaching buttons, and has for its object to provide a machine of this class, in which the buttons shall be fed either mechanically or by hand from a hopper into a slotted tube, by means of which they shall be conveyed to and held in the desired position while wire is being fed through the eye of each successive button, as set forth in my former application, Serial #39,077, filed July 10th, 1915, of which this application is a division.

A further object of this invention is to provide a hood on the feeder contained within the hopper to prevent the buttons from bouncing off of the feeder when it is suddenly actuated.

Another object of the invention relates to a feed finger having a pin which rides up over a button chute gate for preventing the finger from kicking the button back up the chute instead of gripping it.

A further improvement in the machine is in the timing of the button feed lever so that it holds a button in a certain position long enough for the wire to be fed through the eye while the machine is still being operated.

A further feature of the invention lies in the cam disk which drives the mechanism, which has a cam on one side for operating the button feeder.

Figure 8:
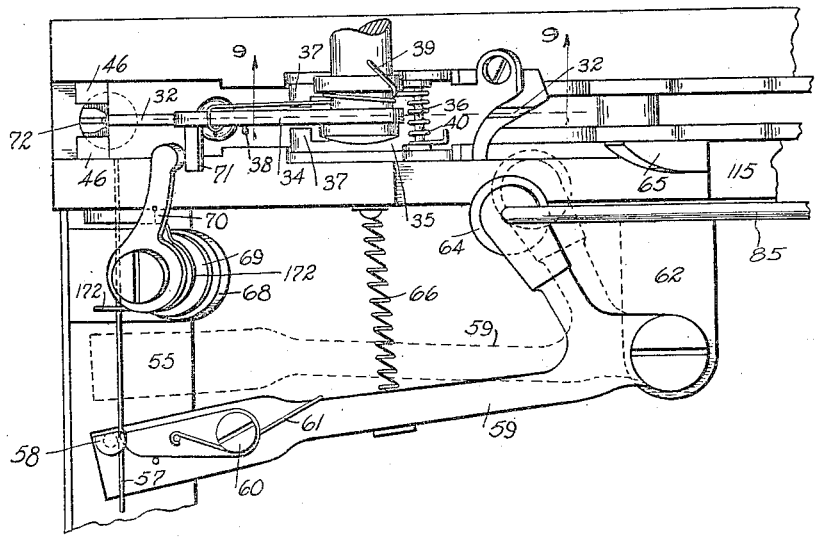
Figure 9:
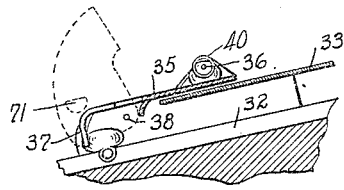
Figure 10:
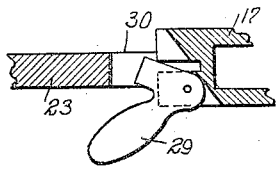

The full nature of this invention will be understood from the accompanying drawings and the following description and claims:

In the drawings Figure 1 is a side elevation of the machine. Fig. 2 is a side elevation of the machine showing the opposite side from Fig. 1 with the button in position to have the wire fed through, and the pedestal removed. Fig. 3 is a plan view of the machine. Fig. 4 is the same as Fig. 1 showing the machine in position to grip a button, with the pedestal removed. Fig. 5 is a front elevation of the machine in idle position. Fig. 6 is a section on the line 6—6 of Fig. 5 with the button in position to receive the wire. Fig. 7 is the same as Fig. 6 with the arm in position to grip a button and one button in position to be clamped. Fig. 8 is a plan view on the line 8—8 of Fig. 2. Fig. 9 is a longitudinal section of the button gate on the line 9—9 of Fig. 8. Fig. 10 is a section on line 10—10 of Fig. 4.

In the drawings there is shown a pedestal having a table 10 on which the mechanism is mounted, said table being secured to a base 11 by means of a hollow tube. A foot pedal 12 is fulcrumed on the base at 13 and pivoted at 14 to a rod 15 extending through the hollow tube to cam disks 115 and pivoted thereto at 16. Said cam disks are mounted in the frame 17 on a pin 18, and are held in their normal inoperative position by means of a spring 19 secured at its lower end to the hollow tube and at its other end to a rod 20 pivoted on said disks at 21.

Secured to the frame of the machine there is a hopper 22 adapted to receive a supply of buttons which it is desired to have fed into the machine. A feeding plate 23 operates through the bottom of said hopper, said hopper having a guiding slot 123 for guiding said plate 23. There is a slot 24 in the upper end of said plate for picking up the buttons in the hopper and arranging them preliminary to feeding the machine. Said plate is yieldingly held to the top of the pedestal by a rod 124 extending therethrough and having a spring 25 below the table for resisting its upward movement and a spring 26 above the same for limiting the downward movement of the plate 23. There is a plate spring 27 secured to the bottom of the plate 23 adapted to be engaged by a roller 28 on said disks for elevating said plate so that the button slot 24 is in alinement with a button race 32 secured to the frame 17 as is shown in Fig. 7.

On the other hand, if it is desired to feed buttons into the machine by hand, the plate may be elevated to the position shown in Fig. 4 and held in that position by a plate 29 pivoted in a slot in the side frame and engaging the slot 30. Over the slot of said plate there is a hood 31 to keep the buttons from bouncing off when the feeding plate is suddenly elevated. Slanting downward from the hopper there is a button chute 32 covered by a hood 33 for allowing the buttons to slide down in position to be gripped by the button feed finger 34. On said button chute there is a button gate 35 which holds the button, as shown in Fig. 6, in readiness to be gripped by the feed finger. Said gate is pivoted at 36 and has two finger members 37, as shown in Fig. 3, one of which is adapted to engage the pin 38 on the said finger, as shown in Fig. 15, and elevate said finger to a position over the button where, by means of the spring 39, the finger drops down on top of said button, as shown in Fig. 7, the pin passing through the opening between said fingers 37. The button is then carried downward by said feed finger forcing the gate fingers upward against the spring 40, which returns them to position in time to engage the following button and hold it until the said finger returns. Said finger is operated by the pedal 12 acting through the rod 15 on the disk 115 which turns about a quarter of a revolution. On said disk there is a pin 41 which extends between a plate spring 42 and the arm 43 which is fulcrumed at 44 and pivoted to the feed finger on its opposite end. There is a screw 45 extending through the end of said spring 42 and lever 43 having a spring 46 thereon adapted to take up the continued movement of the disk while the said finger is holding the button in position long enough for wire to be fed through the eye.

On the under side of the button race there is a cut-off ram 46, as shown in Figs. 6, 7, and 8 slidable in a guide frame 47 and having a slot in which a staple driver 48 is adapted to slide.

There is a roller pin 49 on said disk adapted to be engaged by two projections on the said staple driver, so that the movement of the disk will force the driver down toward the staple forming anvil 50. The same movement forces the cut off ram toward said anvil by means of a roller pin 51 on said disk engaging a cam lever 52 pivoted at 53, which in turn engages a spring member 54, which is secured to the underside of said cut-off ram. By means of the lever 52 engaging said spring, the force applied by the roller pin 51 is yieldingly resisted so that any thickness of material or fabric, which is inserted between the anvil and the cut-off ram may be used without injuring the mechanism of the machine, as the spring tension allows the cut-off ram to give to a certain degree when forced against the anvil.

There is a plate 55 extending outwardly from one side of the machine having a member 56 adapted to hold a coil of wire not shown. The wire 57 extends through a gripping finger 58, which is pivoted to a bell crank 59 at 60 and has a spring 61 for holding said finger against the wire when said lever is moved toward the machine and allowing said finger to slip loosely over the wire when said lever is forced away from the machine, by which means a certain length of wire is pushed into the cutting mechanism upon each operation of the machine. Said crank 59 is fulcrumed to a stationary lip 62 secured to one side of the machine, and has a roller 64 upon the other end adapted to engage a cam 65 on one of said disks, which throws the gripping finger in position to grip another length of wire after its operation. There is a spring 66 secured to the lever and frame of the machine for pulling the gripping finger toward the machine to feed the wire. The wire 57 passes through a wire feed trip 67 before entering the cut-off mechanism, as shown in Figs. 3 and 8. There is a plate 68 having a groove through which the wire passes to be engaged therein by an eccentric cam 69 having an arm 70 adapted to be engaged by a pin 71 on the button feed lever. A spring 172 is secured to the plate 68 and to the arm 70 so as to return said arm when disengaged by said pin to a position such that the wire is gripped securely between the eccentric cam 69 and the plate 68. The purpose of the wire feed trip is to prevent wire from being fed into the machine unless a button is in place to receive it. Unless there is a button under the feed lever the pin 71 will not engage the arm 70 so as to permit the wire to pass through. The wire, on being fed through the wire feed trip, passes through the groove in the plate 68 between the front end of the cut-off ram and the staple forming block 72. Said staple forming block extends downwardly between the guide plates 47, as shown in Figs. 7 and 8. There is a coil spring 74 under a head 73 on the lower end of said block, adapted to force said block upwardly into its engaging position, where it is held while the cut-off ram passes it and cuts off the wire, which it forces around said block so as to form a staple. There is a shoulder on said cut-off ram, as shown in Fig. 6, which engages a shoulder on said staple forming block and forces it downwardly against the spring 74, so as to allow the button, staple, and staple driver to ride over it.

In order to prevent buttons from entering the button chute in the wrong position, there is a plate 76 fulcrumed at 77 in the slot of the main button chute adapted to be thrown outwardly therethrough, as shown in Fig. 6, with enough impetus to throw a button off of the chute unless it is held therein by its eye. Said plate is engaged by pins 78 and 79 so that the movement of the plate 23 will lower the button engaging end of the plate 76 so as to allow the buttons to pass on down the chute. This prevents overturned buttons from sliding down and being in the way of the other buttons and stopping the proper feeding of the buttons.

Pivoted to the same end of the bell crank 59 as the roller 64, there is a rod 85 which has an enlarged end 86 passing through the hopper for engaging and agitating the buttons therein. By means of the movement the buttons are constantly thrown into a position to be picked up by the plate 23.

The operation of the machine is as follows:

When the machine is in inoperative position, or at rest, there is a button gripped by the button feed finger with a wire extended therethrough in a position to be cut off and the button feed plate is at its lower position ready to gather buttons from the hopper on its upward movement.

When the pedal is pushed down, the plate 23 is raised with buttons gathered from the hopper in position to enter the chute, the button feed finger leaves the button in place and is raised up over the button gate 35 to grip a second button. The cut-off ram is pushed downwardly and cuts off the wire which has been inserted through the eye of the button and forms it into a staple around the staple forming block. The staple forming block is then forced downward out of the way and the staple driver pushes the staple against the anvil where it is clenched, all substantially as shown in Fig. 7.

When the pedal is raised, the plate 23 is lowered in position to pick up more buttons, the feed finger drops down inside of the gate and grips a button, moving it downward in position to receive wire through its eye, the feed finger engages the arm 70 and allows the wire to pass in position to be cut, and the staple forming block is returned to operative position, substantially as shown in Fig. 6.

The operations are thereafter repeated as described. Thus a complete operation of the machine is obtained by the two movements of pressing down and releasing the foot pedal.

The invention claimed is:

1. In a button attaching machine including a frame, a button chute, a button hopper at one end of said chute, a feeding plate adapted to be operated in said hopper, means on said machine for operating said plate, an inclined button chute on the upper end of said plate, and means for locking said plate in alinement with said button chute when so desired.

2. In a button attaching machine including a frame, a button chute, a hopper at one end of said chute, a button feeding plate adapted to be operated in said hopper, said plate having a recess in its lower end, and a lever pivoted to said frame adapted to enter said recess when said plate is in elevated position so as to lock it in said position.

3. In a button attaching machine including a frame, a button chute, a button hopper at one end of said chute, a feeding plate adapted to be operated in said hopper, a plate spring on the bottom of said feeding plate, disks in said frame for operating said machine, and a roller extending from the periphery of said disks for engaging said spring and operating said feeding plate.

4. In a button attaching machine including a frame, a button chute, a button feed finger adapted to operate on said chute, means connected with said machine for operating said feed finger, a button gate on said chute, downwardly extending fingers on said gate, and a means on said feed finger adapted to engage one of said fingers for elevating said feed finger over said gate in position to drop down between said fingers on one of the buttons.

5. In a button attaching machine including a frame, a button chute, a button feed finger, an oscillatory plate on said frame, means for operating said plate to move said finger, and means for taking up the continued movement of said plate when said feed finger is arrested.

6. In a button attaching machine including a framework, a button chute, a button feed finger adapted to operate on said chute, a disk in said frame, means for operating said disk, a lever fulcrumed on said frame and pivoted at one end to said feed finger, a spring on the other end of said lever, and a pin on said disk for yieldingly engaging said lever so as to take up the continued movement of said disk when said feed finger is held in a certain position.

In witness whereof, I have hereunto affixed my signature in the presence of the witnesses herein named.

LORA E. POOLE.

Witnesses:
 CHARLES K. BAGOL,
 FANCHIONE DENNIS.

Copies of this patent may be obtained for five cents each, by addressing the "Commissioner of Patents, Washington, D. C."